United States Patent
Habacker

(10) Patent No.: US 7,182,388 B2
(45) Date of Patent: Feb. 27, 2007

(54) CABRIOLET VEHICLE WITH A HOOD COMPARTMENT WHICH RECEIVES THE CABRIOLET HOOD

(75) Inventor: Norbert Habacker, Bramsche (DE)

(73) Assignee: Wilhelm Karmann GmbH, Osnabrück (DE)

( * ) Notice: Subject to any disclaimer, the term of this patent is extended or adjusted under 35 U.S.C. 154(b) by 59 days.

(21) Appl. No.: 10/531,100

(22) PCT Filed: Oct. 4, 2003

(86) PCT No.: PCT/DE03/03281

§ 371 (c)(1),
(2), (4) Date: May 4, 2005

(87) PCT Pub. No.: WO2004/035338

PCT Pub. Date: Apr. 29, 2004

(65) Prior Publication Data

US 2006/0038426 A1 Feb. 23, 2006

(30) Foreign Application Priority Data

Oct. 12, 2002 (DE) ................................ 102 47 724

(51) Int. Cl.
*B60J 7/20* (2006.01)
(52) U.S. Cl. .................................. 296/107.08
(58) Field of Classification Search ............ 296/107.08
See application file for complete search history.

(56) References Cited

U.S. PATENT DOCUMENTS 2,966,697 A * 1/1961 Mintz ........................ 16/332

FOREIGN PATENT DOCUMENTS

| DE | 39 37 764 | 12/1990 |
| DE | 298 01 914 | 2/1999 |
| DE | 199 12 893 | 9/2000 |
| DE | 199 59 700 | 2/2001 |
| DE | 199 60 905 | 5/2001 |
| EP | 0638453 | * 2/1995 |

* cited by examiner

*Primary Examiner*—Dennis H. Pedder
(74) *Attorney, Agent, or Firm*—Gudrun E. Huckett

(57) ABSTRACT

A convertible vehicle has a carbody and a top connected to the carbody. A top compartment is provided for receiving the top when the top is open. A top compartment lid for closing the top compartment is pivotably supported on the carbody by a hinge device. The hinge device has a frame part connected to the carbody, a connecting part, and a hinge lifter having a first end connected to the frame part by a first hinge and a second end connected by a second hinge to the connecting part mounted on the top compartment lid. The hinge device has an integrated movement lock between the connecting part and the frame part. The movement lock is moved by an opening movement of the top compartment lid into a securing position counteracting a return movement of the top compartment lid. The securing position is releasable for closing the top compartment lid.

16 Claims, 6 Drawing Sheets

CABRIOLET VEHICLE WITH A HOOD COMPARTMENT WHICH RECEIVES THE CABRIOLET HOOD

BACKGROUND OF THE INVENTION

The invention relates to a convertible vehicle with of foldaway top that can be deposited in a top compartment comprising a top compartment lid.

In known convertible vehicles (EP 0 638 453 B1) a rear top compartment is provided for receiving the folding top and the top compartment can be closed by a top compartment lid. In order to be pivotably supported, this top compartment lid comprises a hinge device that is attached to the vehicle body. The frame part of the hinge device that is embodied as a bearing bracket and attached to the carbody is provided with a hinge lifter that supports the top compartment lid which hinge lifter is pivotable by means of several levers controlling it. In this connection, by means of an additional pulling lever a tilting action of the hinge lifter is possible so that the top compartment lid connected to the hinge device can perform a tilting movement for locking and unlocking a locking device in the area of the connecting part connecting the lid to the hinge lifter.

The invention relates to the problem of developing a convertible vehicle having a top compartment lid covering the top compartment wherein the hinge device, when moved into the opening position, forces with minimal technical expenditure the top compartment lid into a secured position and wherein, in this connection, by means of a simple emergency release a return movement of the top compartment lid into the locking position is possible independent of its automatic drive.

SUMMARY OF THE INVENTION

Based on a convertible vehicle of the aforementioned kind, the invention solves this object in that on the hinge lifter a movement lock is provided that is active between the connecting part and the frame part and, when opening the top compartment lid, is movable into a securing position counteracting a return movement thereof and releasable for closing the top compartment lid. With regard to essential additional embodiments, reference is being had to the dependent claims.

The top compartment lid for the convertible vehicle according to the present invention has a hinge device that, in the area of its hinge lifter, is provided with a structural component module as a movement lock integrated into the opening and closing process. In this connection, the top compartment lid is moved by means of a drive system engaging it at a spacing to the at least one hinge device, for example, by means of a hydraulic lifting cylinder; the parts of the movement lock are entrained and in the opening position blocked such that a safe support position of the top compartment lid is ensured.

This movement lock is designed such that in the area of the hinge device by means of support elements that rest against one another a clamping action is achieved with which movement of the parts is blocked. In particular in an almost vertical opening position of the top compartment lid, this leads to a return pivoting action being prevented and a return pivot moment caused by its weight being frictionally or positively received by the structural components in the clamping position.

For the return movement of the top compartment lid from this secured upright position, the lifting drive system (with reverse movement sequence relative to the opening phase) and a control device correlated with the movement lock interact such that in a first return pivoting phase only a pivoting action of the top compartment lid in the area of its connecting part to the hinge lifter is realized; at the end of this movement phase the parts of the movement lock are released, and, subsequently, a common return pivoting action of the top compartment lid and the hinge lifter is initiated.

The movement lock and the correlated control device are combined with an emergency actuation with which, even when the automatic drive of the top compartment lid fails, a release of the movement lock by hand is possible. In this connection, the hinge lifter in its upper opening position is manually released and the downward movement of the top compartment lid can be initiated, for example, by direct pressure exerted manually onto the topside of the lid such that a uniform return movement of the top compartment lid into the closing position can be performed which return movement is sufficiently braked in the area of the hinge device.

BRIEF DESCRIPTION OF THE DRAWINGS

Further details and further configurations of the invention result from the following description and the drawing in which one embodiment of the convertible vehicle having a top compartment lid supported by a hinge device is illustrated in more detail. The drawing shows in.

DESCRIPTION OF PREFERRED EMBODIMENTS

Figure 1:
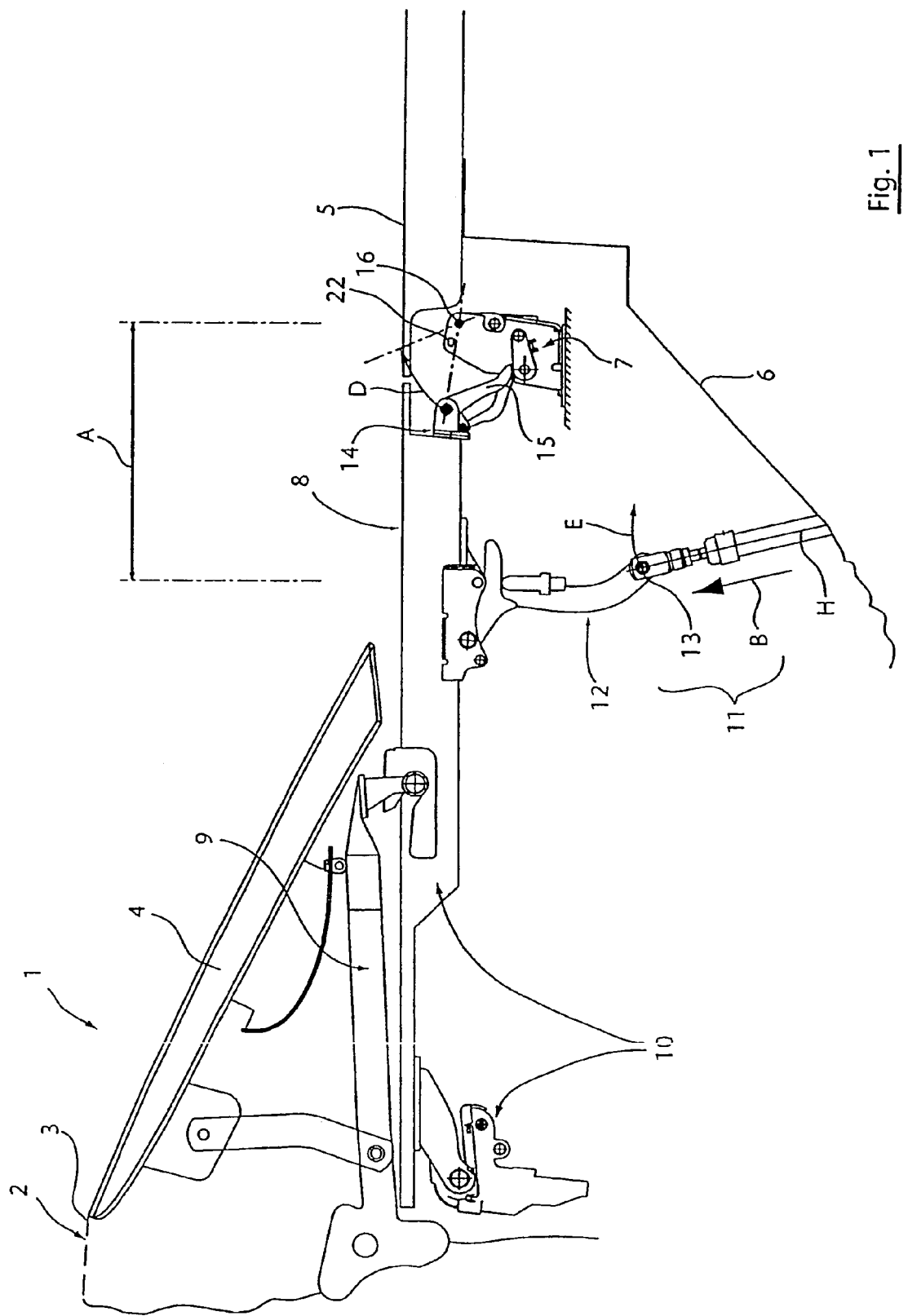
FIG. 1 a schematic side view of a portion of the top frame of a convertible vehicle (without the roof skin of the folding top) with a kinematic drive in the area of a top compartment lid supported by a hinge device in the closed position.

In FIG. 1, a convertible vehicle identified by 1 is shown partially in a schematic illustration of its rear area wherein a folding top 2 illustrated in its closed position has a rear window 4 integrated into the roof skin 3. From the illustrated closed position, the folding top 2 can be moved into an open position (not illustrated) in which it is stored in a top compartment 6 closable by the top compartment lid 8. The top compartment lid 8 that is integrated substantially in a U-shape into the vehicle body, extends in a closed position substantially in one plane with the trunk lid 5, not illustrated in detail.

Figure 2:
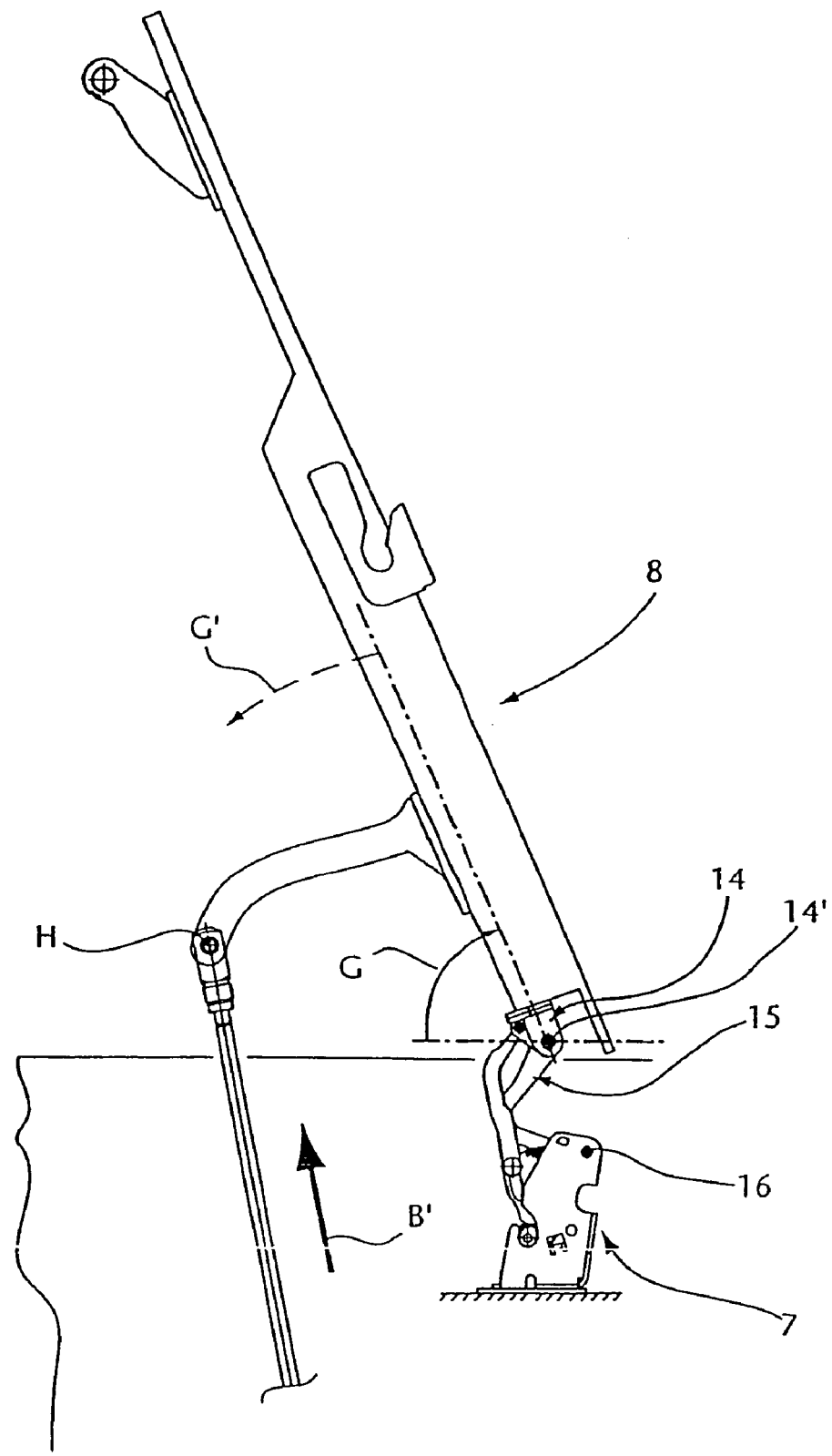
FIG. 2 a detail view of the top compartment lid with the hinge device in the open position.

The top compartment lid 8 is supported pivotably on the carbody in particular by two hinge devices 7 and 7' (not visible in the side view according to FIGS. 1 and 2) that are mirror-symmetrical to a longitudinal center plane of the vehicle. Forwardly in the traveling direction, the top compartment lid 8 interacts with at least one locking device 10

(FIG. 1) provided in the area of a lateral top side rail 9. EP 0 638 453 B1 discloses that in the area of such locking devices 10 the top compartment lid 8 can be locked to, or unlocked in the opposite direction from, the top side rail 9 by a pivot-push movement.

For realizing this movement in the area of the locking device 10 and a corresponding opening or closing movement in the area of the top compartment lid 8 (FIG. 2), lifting drives 11 and 11' (not visible in the side view) are provided on the lateral sides thereof, respectively. The lifting drive 11 engages the top compartment lid 8 in front of the hinge device 7 at spacing A therefrom. The lifting drive 11 engages essentially with a vertical lifting axis H an actuator 12 connected to the top compartment lid 8 in the area of a hinge connection 13.

By means of this driving and guiding unit comprised of actuator 12 and hinge device 7, a pivot movement E of the lifting drive 11 in the area of the actuator 12 can be realized when a drive movement (FIG. 1, arrow B) is carried out; this movement can be transmitted onto the top compartment lid 8; and, in this way, a movement of the structural component module in accordance with arrow D can take place at the same time in the area of the hinge device 7. When continuing the drive movement (arrow B', FIG. 2), the top compartment lid 8 is pivoted upwardly into its upper almost vertical position (arrow G, FIG. 2).

In this connection, the top compartment lid 8 connected to the hinge device 7 is pivotably connected in the area of a connecting part 14 having a hinge 14' to a hinge lifter 15 provided as a support part (FIG. 3) whose other end is supported in the area of a pivot support having a first hinge 16 on the frame part T of the hinge device 7.

Figure 3:
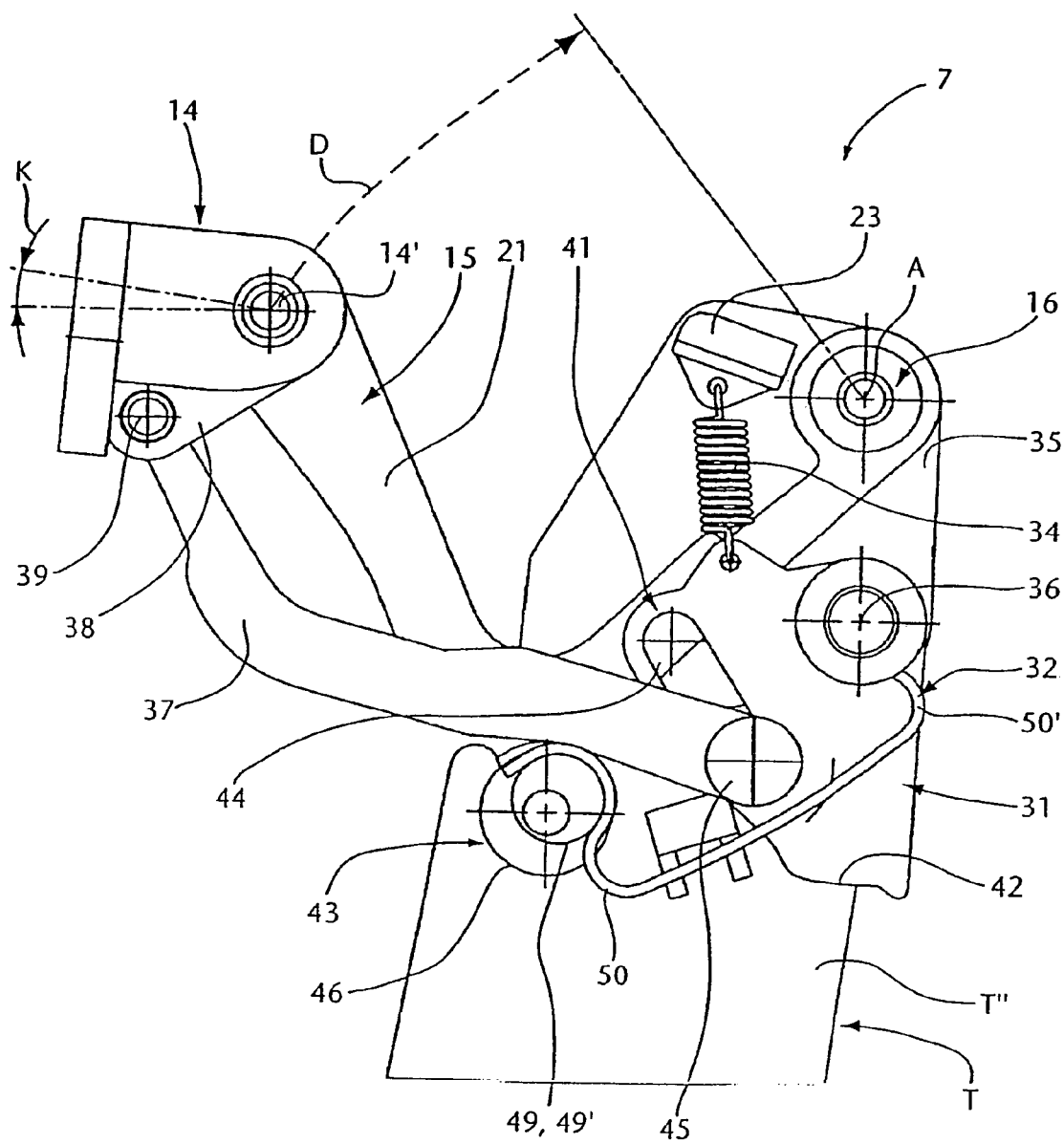
FIG. 3 an enlarged illustration showing individually the hinge device (without top compartment lid) in the closed position.
Figure 4:
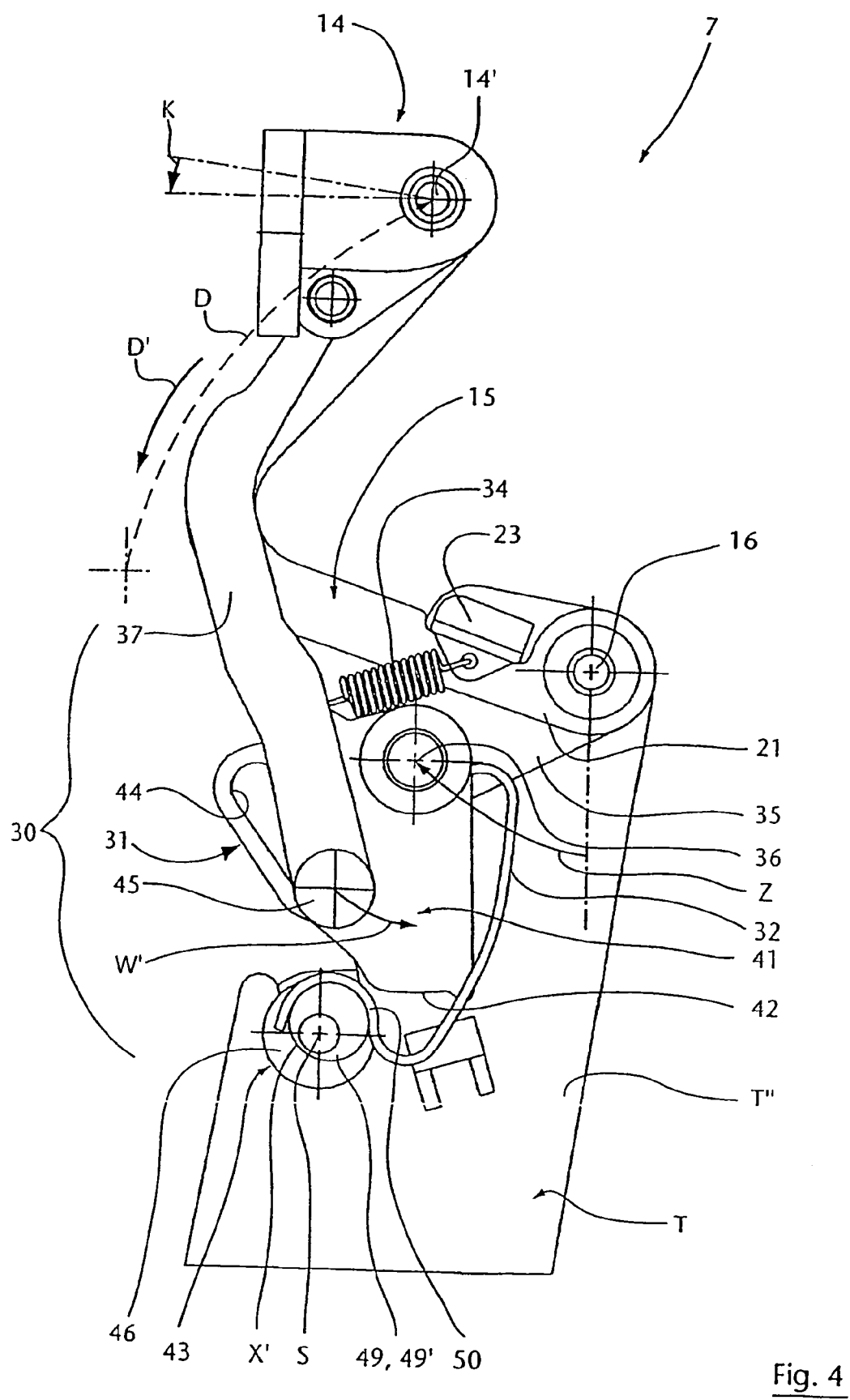
FIG. 4 an illustration similar to FIG. 3 showing individually the hinge device in a first opening phase.

FIG. 4 additionally illustrates by means of arrow K that the connecting part 14 is pivotable relative to the hinge lifter 15 so that, in this way, the top compartment lid 8 in particular in the first phase (FIG. 3 to FIG. 4) during the opening process (or in the reverse sequence in the end phase when closing the top compartment lid) can undergo a tilting action that is effective at the forward locking device 10 (FIG. 1).

In the illustrations according to FIGS. 3 through 6, the joint device 7 is illustrated individually in more detail; in the embodiment according to the invention, it comprises in the proximity of the hinge lifter 15 a movement lock (FIG. 5: locking position) that is effective between the connecting part 14 and the frame part T and is identified by 30. This movement lock 30 can be moved upon opening of the top compartment lid 8 into a securing position that counteracts a return movement of the lid (arrow D in FIG. 4) in the area of the hinge lifter 15, and, for closing the top compartment lid 8, the movement lock 30 is releasable so that a return movement of the hinge lifter 15 together with the top compartment lid 8 can be realized, which return movement is controlled within the hinge device 7.

Figure 5:
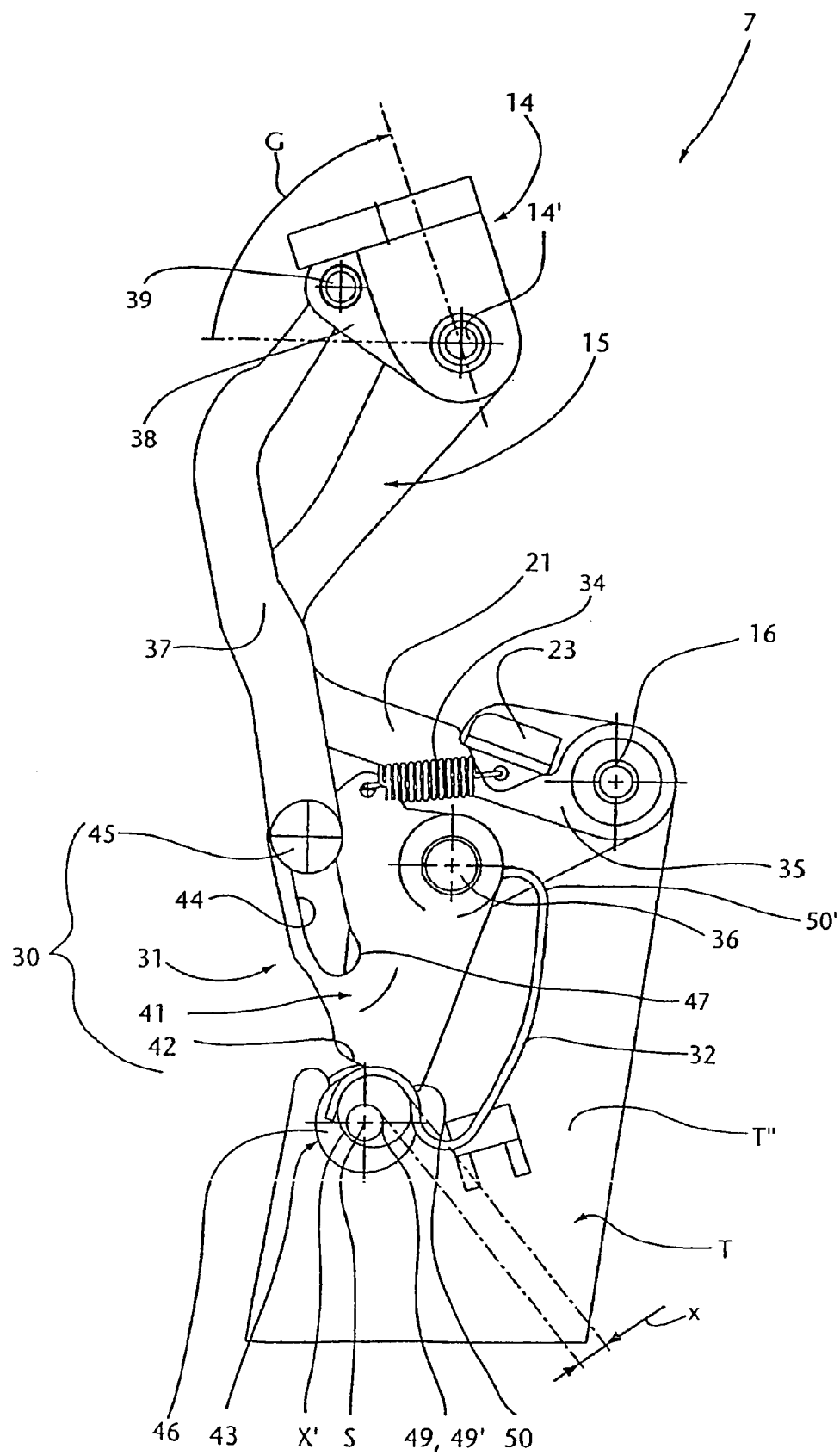
FIG. 5 an illustration similar to FIG. 4 showing individually the hinge device in the open position according to a section view V—V in FIG. 6.
Figure 6:
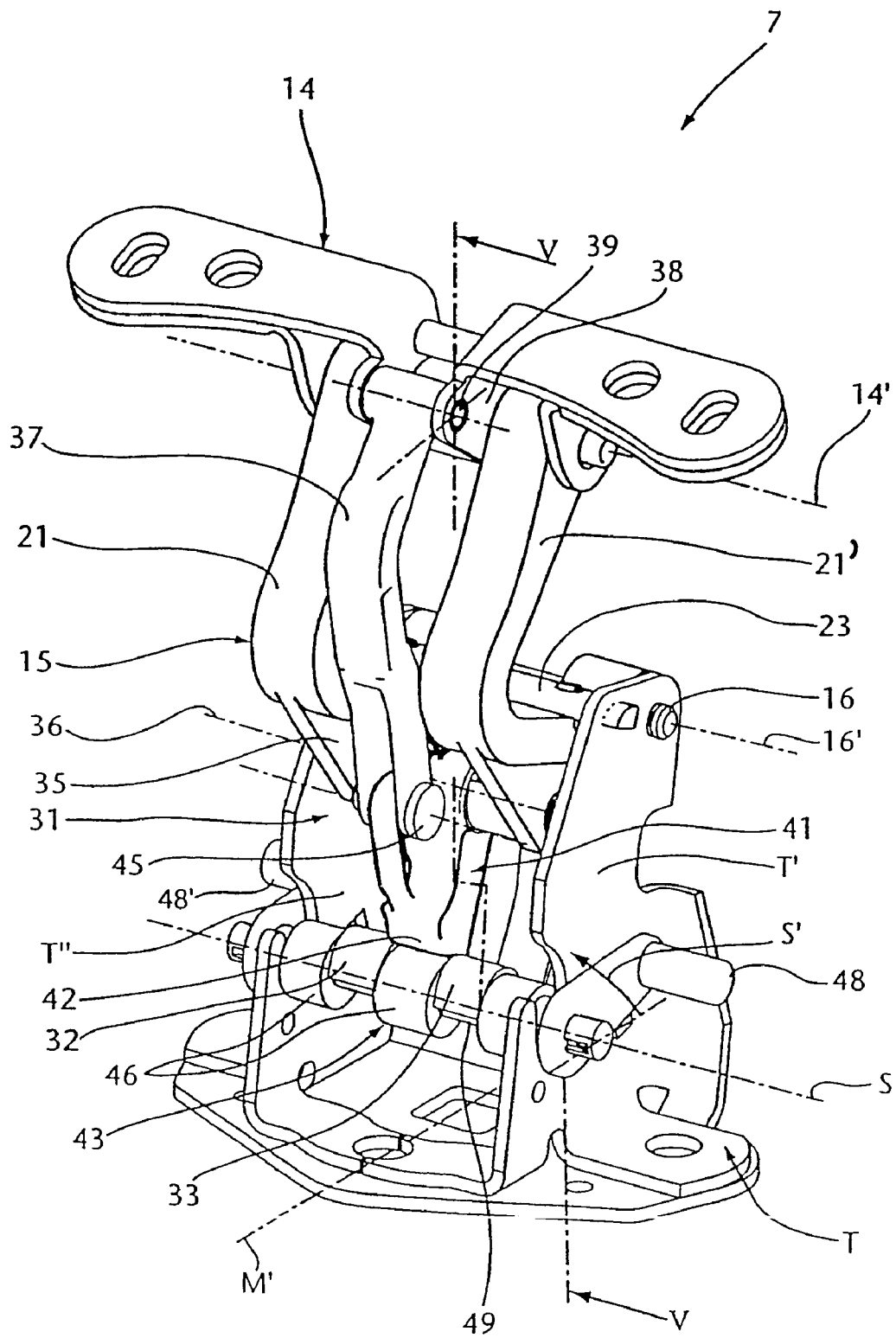
FIG. 6 a perspective illustration showing individually the hinge device similar to the open position according to FIG. 5.

The movement lock 30 cooperates in this connection with a control device 31 that is pivotably connected relative to the frame only on the hinge lifter 15 in the area of a transverse axis 36 so that the effective movement phases resulting from moving the top compartment lid 8 and the hinge lifter 15 are transmitted position-precisely onto the parts of the movement lock 30, and the latter is lockable in particular in a clamping position (FIG. 5, FIG. 6).

The movement illustrations according to FIGS. 3 to 5 showing the sequence of the opening process illustrate that the hinge lifter 15 supported on the frame part T in the area of the hinge 16 is pivotable during the opening process (arrow D) initiated by the lifting drive 11 of the top compartment lid 8 toward a stop 23 that is fixed on the frame. In a pivot direction Z, the parts of the control device 31 are moved also. Subsequently, with the hinge lifter 15 being in the stop position (FIG. 4), the top compartment lid 8 connected to the part 14 is pivoted farther (FIG. 5, arrow G) and, when doing so, the parts of the movement lock 30 that are guided by the control device 31 are moved into a blocking position (transition phase FIG. 4 to FIG. 5).

All of the above described movements in the area of the hinge device 7 and of the movement lock 30 are automatically initiated by means of the lifting drive 11 and by the described hinge connections and lifting parts. For stabilizing the system, the hinge device 7 is provided in the area of the hinge lifter 15 with spring modules comprising two leaf springs 32, 33 and a tension spring 34 and assisting the movements of the control module 31 and/or of the top compartment lid 8, respectively.

The movement of the top compartment lid 8 and of the connecting part 14, which movement is combined of the partial movement paths D and G, is controlled in the area of the hinge device 7 in that the hinge lifter 15 is configured as a substantially L-shaped pivot lever 21. The L-shaped pivot lever 21 is connected pivotably with one end by means of the connecting part 14 to the top compartment lid 8 and with the other end to the hinge frame T mounted on the carbody by means of the hinge connection 16; between these two hinges 14' and 16, a projection 35 (FIG. 6) is provided on the L-shaped pivot lever 21 on which in the area of the transverse axis 36 a control device 31 is pivotably attached that extends toward the connecting part 14 in the upward direction.

The perspective illustration according to FIG. 6 makes clear that the hinge device 7 is substantially mirror-symmetrical to its longitudinal center plane M' and is provided with two of the L-shaped pivot levers 21 and 21' that in the area of the first hinge connection 16 have a common pivot axis 16' on the frame part T. In this way, the control device 31 is advantageously supported between the two L-shaped pivot levers 21 and 21' with its transverse axis 36 and, extending away therefrom, a centrally extending control lever 37 is attached pivotably by hinge 39 to a projection 38 of the pivotable connecting part 14.

The sectioned side view according to FIG. 5 (FIGS. 3 and 4 correspond also to this section illustration of FIG. 6) shows the configuration of the control device 31 employed as a movement lock 30 wherein, in the area of its transverse axis 36, it has a pivotable control disk 41 that, in turn, is connected to the control lever 37 that receives the movement of the top compartment lid 8 from the connecting part 14 and is provided in proximity of this connecting area with a profiled clamping section 42. This profiled clamping section 42 can be moved toward a counter member that is stationarily connected to the frame and is in the form of a stop shaft 43 with which in the contact position (FIG. 5) a clamping connection is generated such that the parts 42 and 43 block further movement.

For controlling these parts as illustrated in the movement phases according to FIGS. 3 to 5, the control lever 37 of the control device 31 is guided in a slotted hole 44 of the control disk 41 by means of a joint bolt 45. In this connection, the control disk 41 is secured by means of a tension spring 34 engaging above the slotted hole 44 in a permanent nominal position on the control lever 37 until the movement lock becomes effective. At the same time, the parts are tensioned relative to one another as well as relative to the frame in the area of the hinge device 7 in that between the control device 31 and the two hinge lifters 21, 21' the two leaf springs 32, 33 that extend between the upper transverse axis 38 and the lower stop shaft 43 rest with their double-arc-shaped ends 50, 50' on the stop shaft 43 and the transverse axis 36, respectively. In this way, the stop shaft 43 is secured by a spring force in its position of use in which it engages with cylindrical stop cam 46 from below the profiled clamping section in the area between the legs T' and T" of the frame part T.

In the upper pivot position of the top compartment lid 8 (FIG. 5, FIG. 6), the contacting conditions generate between the cylindrical stop cam 46 of the stop shaft 43 and the profiled clamping section 42 a braking, locking, or dead center position. The control disk 41 is supported with the profiled clamping section 42 on the stop shaft 43 so that the support force is transmitted through the transverse axis 36 onto the two L-shaped pivot levers 21, 21' and their return pivot movement about the pivot axis 16' is blocked.

This blocking action can be released, based on FIG. 5, by means of the lifting drive 11 in a reverse movement sequence (corresponding to FIGS. 4 and 3) during the automatic closing action in that the control lever 37 (arrow Z', FIG. 5) that is moving back comes to rest in the slotted hole 44 against the lower area 47.

Subsequently, the clamping force of the control disk 41 on the cylindrical stop cam 46 of the stop shaft 43 is released by means of the control lever 37 such that the latter moves the control disk 41 in the direction of arrow W' (FIG. 4). The closing movement of the top compartment lid 8 is now continued counter to the opening movements (arrow D, K) illustrated in FIG. 3 and the top compartment lid 8 can be locked in the area of the locking device 10.

The hinge device 7 is provided in the area of the movement lock 30 with an emergency release which in the illustrated embodiment is provided in the area of the stop shaft 43. As an emergency release, on the stop shaft 43 (FIG. 6) at least one manual lever 48 (and 48' on the other side) is provided that can be pivoted against the tensioning force of the leaf springs 32, 33. This release possibility (arrow S' ) is achieved in that the leaf springs 32 and 33 on both sides of the cylindrical stop cam 46 provided for the central control disk 41 are supported on the stop shaft 43 by means of a cam part 49, 49' (FIG. 5) that extends eccentrically to the longitudinal axis S of the stop shaft 43 and is thus eccentrically shaped, respectively.

Upon movement of the manual lever 48 in the pivoting direction S' the leaf springs 32, 33 are relieved in that their ends 50 pressure-loaded by the profiled eccentric section X (FIG. 5) after performing a 180° pivot movement S' rest only against the profiled section identified by X' and its smaller height causes relief of the springs 32 and 33. In this way, the top compartment lid 8 can perform in the area of the clamping connection 42 and 43 the afore described release movement according to the direction of arrow W such that the top compartment lid 8 that is already manually loaded can be lowered into the locking position.

What is claimed is:

1. A convertible vehicle comprising:
   a carbody;
   a top connected to the carbody;
   a top compartment for receiving the top when the top is in an open position;
   a top compartment lid having at least one hinge device for pivotably supporting the top compartment lid on the carbody;
   the hinge device having a frame part connected to the car body, a connecting part, and at least one hinge lifter having a first end connected to the frame part by a first hinge and having a second end connected by a second hinge to the connecting part, wherein the connecting part is mounted on the top compartment lid;
   the hinge device having an integrated movement lock between the connecting part and the frame part, wherein the movement lock is moved by an opening movement of the top compartment lid into a securing position counteracting a return movement of the top compartment lid, wherein the securing position of the movement lock is releasable for closing the top compartment lid, and wherein the movement lock comprises a control device connected to the hinge lifter to be pivotable about a transverse axis; and
   a lifting drive acting on the top compartment lid for causing the opening movement of the top compartment lid, wherein the hinge lifter during the opening movement of the top compartment lid initiated by the lifting drive is pivotable toward a stop of the frame part, wherein, when the hinge lifter rests against the stop, the top compartment lid is pivoted farther and the movement lock guided by the control device is moved into the securing position.

2. The convertible vehicle according to claim 1, wherein the top compartment lid is pivotable in the area of the connecting part relative to the hinge lifter.

3. The convertible vehicle according to claim 1, wherein the movement lock is adapted to be returned by the lifting drive into a release position.

4. A convertible vehicle comprising:
   a carbody;
   a top connected to the carbody;
   a top compartment for receiving the top when the top is in an open position;
   a top compartment lid having at least one hinge device for pivotably supporting the top compartment lid on the carbody;
   the hinge device having a frame part connected to the car body, a connecting part, and at least one hinge lifter having a first end connected to the frame part by a first hinge and having a second end connected by a second hinge to the connecting part, wherein the connecting part is mounted on the top compartment lid;
   the hinge device having an integrated movement lock between the connecting part and the frame part, wherein the movement lock is moved by an opening movement of the top compartment lid into a securing position counteracting a return movement of the top compartment lid, wherein the securing position of the movement lock is releasable for closing the top compartment lid, and wherein the movement lock comprises a control device connected to the hinge lifter to be pivotable about a transverse axis; and
   a spring module that connects the hinge lifter and the control device or the frame part, wherein the spring module assists movements of the top compartment lid.

5. The convertible vehicle according to claim 4, further comprising a lifting drive acting on the top compartment lid for causing the opening movement of the top compartment lid, wherein the hinge lifter during the opening movement of the top compartment lid initiated by the lifting drive is pivotable toward a stop of the frame part, wherein, when the hinge lifter rests against the stop, the top compartment lid is pivoted farther and the movement lock guided by the control device is moved into the securing position.

6. A convertible vehicle, comprising:
a carbody;
a top connected to the carbody;
a top compartment for receiving the top when the top is in an open position;
a top compartment lid having at least one hinge device for pivotably supporting the top compartment lid on the carbody;
the hinge device having a frame part connected to the car body, a connecting part, and at least one hinge lifter having a first end connected to the frame part by a first hinge and having a second end connected by a second hinge to the connecting part, wherein the connecting part is mounted on the top compartment lid;
the hinge device having an integrated movement lock between the connecting part and the frame part, wherein the movement lock is moved by an opening movement of the top compartment lid into a securing position counteracting a return movement of the top compartment lid, wherein the securing position of the movement lock is releasable for closing the top compartment lid, and wherein the movement lock comprises a control device connected to the hinge lifter to be pivotable about a transverse axis; and
wherein the hinge lifter is a substantially L-shaped pivot lever connected by the first and second hinges to the frame part and the connecting part, wherein the L-shaped pivot lever has a projection arranged between the first and second hinges, wherein the control device has a control lever that is pivotably connected to the projection near the transverse axis of the control device, wherein the control lever engages the connecting part.

7. A convertible vehicle comprising:
a carbody;
a top connected to the carbody;
a top compartment for receiving the top when the top is in an open position;
a top compartment lid having at least one hinge device for pivotably supporting the top compartment lid on the carbody;
the hinge device having a frame part connected to the car body, a connecting part, and at least one hinge lifter having a first end connected to the frame part by a first hinge and having a second end connected by a second hinge to the connecting part, wherein the connecting part is mounted on the top compartment lid;
the hinge device having an integrated movement lock between the connecting part and the frame part, wherein the movement lock is moved by an opening movement of the top compartment lid into a securing position counteracting a return movement of the top compartment lid, wherein the securing position of the movement lock is releasable for closing the top compartment lid, and wherein the movement lock comprises a control device connected to the hinge lifter to be pivotable about a transverse axis; and
wherein the hinge lifter comprises two or more L-shaped pivot levers connected by the first hinge to the frame part so as to have a common pivot axis.

8. The convertible vehicle according to claim 7, wherein the control device is supported with the transverse axis between two of the L-shaped pivot levers, wherein the control device has a control lever extending away from the transverse axis and connected pivotably to a projection of the connecting part.

9. The convertible vehicle according to claim 6, wherein the control device comprises a control disk that is pivotably secured on the transverse axis, wherein the control lever is connected to the control disk at a spacing from the transverse axis, wherein a movement of the top compartment lid is transmitted onto the control lever through the connecting part, wherein the control disk has a profiled clamping section that is movable toward a stop part of the frame part and engages the stop part to provide a force-fit connection, a positive connection and/or a frictional connection.

10. The convertible vehicle according claim 9, wherein the control disk has a slotted hole and wherein the control lever is received and guided in the slotted hole.

11. The convertible vehicle according to claim 9, wherein the stop part is a stop shaft that is pivotably supported on the frame part.

12. The convertible vehicle according claim 10, wherein the control disk is secured in a nominal position on the control lever by a tension spring engaging the control lever above the slotted hole.

13. The convertible vehicle according to claim 11, wherein between the control device and the hinge lifter a spring module comprised of two leaf springs is provided, wherein the two leaf springs extend between the transverse axis and the stop shaft, wherein the spring module secures the stop shaft in a position of use in which position of use the stop shaft engages with a cylindrical stop cam from below the profiled clamping section.

14. The convertible vehicle according to claim 13, further comprising an emergency release acting on the movement lock, wherein the cylindrical stop cam of the stop shaft and the profiled clamping section generate a braking position, a locking position or a dead center position that is released by the emergency release.

15. The convertible vehicle according to claim 14, wherein the emergency release is a manual lever provided on the stop shaft, wherein the manual lever acts on the stop shaft for pivoting the stop shaft counter to a tensioning force of the two leaf springs.

16. The convertible vehicle according to claim 13, wherein the stop shaft has two eccentrically shaped cam parts eccentrically arranged relative to a longitudinal axis of the stop shaft, wherein the two leaf springs each are supported on the stop shaft on opposite sides of the cylindrical stop cam on the cam parts, respectively.

* * * * *